J. PLEUKHARP.
SCREW.
No. 188,668. Patented March 20, 1877.
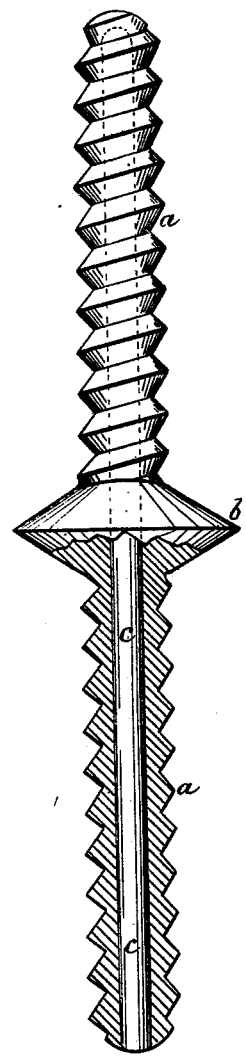
WITNESSES:
W. W. Hollingsworth
A. W. Hart.
INVENTOR:
J. Pleukharp
BY
ATTORNEYS.

UNITED STATES PATENT OFFICE.

JAMES PLEUKHARP, OF COLUMBUS, OHIO.

IMPROVEMENT IN SCREWS.

Specification forming part of Letters Patent No. 188,668, dated March 20, 1877; application filed February 10, 1877.

*To all whom it may concern:*

Be it known that I, JAMES PLEUKHARP, of Columbus, in the county of Franklin and State of Ohio, have invented a new and Improved Screw; and I do hereby declare that the following is a full, clear, and exact description of the same.

My invention has for its object to provide a cheap wood-screw for use in securing the legs of tables to the top or frame thereof; also, for securing together other parts, where it is particularly desirable or necessary the connecting device shall possess flexibility as well as strength. To this end I form the screw of a wrought-iron core and cast-metal shell or exterior portion, the latter having a central circumferential rib or flange and a right-hand thread, so that the screw is of the class known as "double-ended," the thread extending from its respective ends to the rib or flange, as hereinafter described.

In the accompanying drawing, forming part of this specification, I have shown an elevation of my improved screw, partly in section.

The form of screw thus represented is double-pointed, consisting of the parts $a$ $a$, having right-hand thread, and for which the central conical circumferential rib or flange $b$ serves as a common head. The said threaded parts $a$ $a$ and rib $b$ are cast in one piece around the central wrought-iron core $c$, which extends from end to end of the double screw.

To form the screw a wrought-iron rod (of suitable length for the core) is placed in the center of the mold-cavity, and the space around it is then filled with molten iron, in the manner usual in founding. The screw is thus constructed or composed of two qualities or kinds of metal—first, the integral shell $a$ $b$, having the function and configuration common to other double-pointed wood-screws, but which, being formed of cast-iron, is so brittle as to possess very slight flexibility; and, second, the integral core $c$, which, being composed of tough wrought-iron, has a good degree of flexibility. So long, therefore, as the strain to which the screw may be subjected, when used for securing table-legs to the top or frame, is tensile, or in a lengthwise direction, it is borne mainly by the shell $a$ $b$; but when the strain is applied laterally, the want of flexibility of the shell renders it liable to be easily broken, and in such case the core $c$ will yield and bend in the direction of the pressure, but still hold together the threaded parts $a$ $a$, and thereby preserve the function of the screw as such, and prevent the detachment of the respective parts which it is used to connect or secure together.

I do not claim, broadly, the process of casting metal around a wrought-iron core; but What I do claim is—

As an article of manufacture, the double-ended screw hereinbefore described, formed of a wrought-iron core, $c$, and the surrounding cast-metal shell, composed of the parts $a$ $a$, having a right screw-thread, and the central rib or projection $b$, as shown and set forth.

JAMES PLEUKHARP.

Witnesses:
H. M. BUTLER,
T. P. LINN.